United States Patent
McCorkendale et al.

(10) Patent No.: US 7,818,807 B1
(45) Date of Patent: Oct. 19, 2010

(54) SYSTEM AND METHOD OF LOGICAL PREFETCHING FOR OPTIMIZING FILE SCANNING OPERATIONS

(75) Inventors: Bruce McCorkendale, Manhattan Beach, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 1142 days.

(21) Appl. No.: 11/479,435

(22) Filed: Jun. 30, 2006

(51) Int. Cl.
*H04L 9/00* (2006.01)
*G06F 11/00* (2006.01)
*G06F 11/30* (2006.01)

(52) U.S. Cl. ............... 726/24; 726/22; 726/23; 726/25; 713/165; 713/166; 713/167; 713/188; 714/47

(58) Field of Classification Search .............. 726/24
See application file for complete search history.

(56) References Cited

U.S. PATENT DOCUMENTS 5,765,030 A * 6/1998 Nachenberg et al. ......... 714/33
5,983,348 A * 11/1999 Ji ................................. 726/13
6,092,194 A * 7/2000 Touboul ....................... 726/24
2006/0288416 A1 12/2006 Costea et al.

OTHER PUBLICATIONS

Liang, Z., et al, 'Isolated Program Execution: An Application Transparent Approach for Executing Untrusted Programs', Dept. of CS, Stony Brook University, 2003, entire document, http://www.comp.nus.edu.sg/~liangzk/papers/acsac03.pdf.*
"Kernel Enhancements for Windows XP," Updated Jan. 13, 2003, Microsoft Corporation, [online] [Retrieved Mar. 1, 2007] Retrieved from the Internet<URL:http://www.microsoft.com/whdc/driver/kernel/xp_kernel.mspx>.

* cited by examiner

*Primary Examiner*—Edan Orgad
*Assistant Examiner*—Ronald Baum
(74) *Attorney, Agent, or Firm*—Fenwick & West LLP

(57) ABSTRACT

Scanning of a file for malware is performed by prefetching data needed for the scan. The sequence of data to be prefetched is determined based on a previous malware scan of the file. Logical prefetching functionality is used to monitor a sequence of data accesses during the previous malware scan. The sequence is saved and is then later usable to prefetch data in anticipation of a next malware scan of the file.

17 Claims, 4 Drawing Sheets

# SYSTEM AND METHOD OF LOGICAL PREFETCHING FOR OPTIMIZING FILE SCANNING OPERATIONS

BACKGROUND

As the Internet continues to expand in terms of both connectivity and number of users, the amount of malicious software ("malware") existing across the Internet continues to increase at a significant rate. Malware, in the form of, for example, viruses, spyware, and worms, is essentially software code written to infiltrate and/or damage a computer system. In some worst case scenarios, malware can destroy important data, render a computer system virtually useless, and/or bring down a network of hundreds or thousands of computer systems. Recovering a computer system or network from a successful malware attack often requires considerable resources. Further, malware, while typically attacking computer systems connected to the Internet, can also spread from one computer system to the other by, for example, a non-Internet based file transfer between computer systems.

In an effort to protect computer systems against malware, various companies design and offer anti-malware programs (also referred to herein as "security software") (e.g., Norton Antivirus™ by Symantec Corporation). Generally, anti-malware programs use "signatures" and "heuristics" to detect malware. A signature of a particular type of malware is the binary pattern of the malware. Anti-malware programs rely on signatures to detect and identify specific malware. Stored signatures must be kept up-to-date in order for anti-malware programs to remain effective as malware evolves over time. The reliance of anti-malware programs on heuristics involves detecting behaviors that indicate the presence of malware. The behavior could be based on code that is running or on code patterns in files.

Anti-malware programs detect malware by scanning one or more various locations where malware may reside. At a minimum, a typical anti-malware program is capable of scanning the files stored on a hard disk of a computer system. However, as hard disk sizes continue to increase, the amount of time needed to scan files on the hard disk commensurately increases. Thus, at least partly for this reason, there is a need to improve file scanning operations.

Further, those skilled in the art will note that there are behavioral differences between when a file is executed under a non-scanning situation and when the file is scanned for malware. For normal execution of a file, an execution thread accesses the file at an "entry point" (typically, the first code portion of the file), which is in page n of the file. The order of accesses to the file's pages is then determined by the flow of the code (e.g., the first instruction at the entry point may invoke code that is in any other page). There are known technologies for optimizing file execution based on code execution flow through the file. However, such technologies are not necessarily optimized for malware scanning. During a scanning operation, an anti-malware program controls the execution flow through the file in order to best detect malware based on known malware signatures and heuristics. In other words, anti-malware programs scan a file by deterministically scanning portions of the file known to be susceptible to malware attacks. Such flow is typically different than execution flow when the file is executed in a non-scanning scenario. For example, the anti-malware program may first scan first and third code portions of the file even though normal execution of the file would result in execution flow from the first code portion to the second code portion of the file. Thus, there is a further need to improve file scanning operations in view of the fact that technology for optimizing execution of a file is not necessarily optimal for malware scanning of that file.

SUMMARY

According to at least one aspect of one or more embodiments of the present invention, a computer-implemented method of protecting a computer system against malware includes intercepting a request to load an executable file. The computer-implemented method then determines whether a scan-based prefetch file exists for the executable file, where the scan-based prefetch file specifies a sequence of data accesses supporting a malware scan of the executable file. Responsive to a positive determination, the computer-implemented method further includes prefetching data for the executable file based on the sequence.

According to at least one other aspect of one or more embodiments of the present invention, a system for protecting a computer system against malware includes a control interception module capable of intercepting a request to load an executable file. The system also includes a prefetch cache query module capable of determining whether a scan-based prefetch file exists for the executable file, where the scan-based prefetch file specifies a sequence of data accesses supporting a malware scan of the executable file. The system further includes a prefetcher module capable of, responsive to a positive determination, prefetching data for the executable file based on the sequence.

According to at least one other aspect of one or more embodiments of the present invention, a program storage device readable by a machine, tangibly embodying a program of instructions executable by the machine to perform method steps for protecting the machine against malware, includes instructions to intercept a request to load an executable file; determine whether a scan-based prefetch file exists for the executable file where the scan-based prefetch file specifies a sequence of data accesses supporting a malware scan of the executable file; and prefetch, in response to a positive determination, data for the executable file based on the sequence.

According to at least one other aspect of one or more embodiments of the present invention, a computer system having logical prefetching functionality supported by an operating system of the computer system includes security software in operative communication with the operating system. The security software is arranged to intercept control from the operating system of an executable file requested for execution. The security software then scans the executable file for malware and is also arranged to use the logical prefetching functionality to build a prefetch file for the executable file, where the prefetch file specifies a sequence of data accesses supporting the malware scan of the executable file. The security software is further arranged to use the logical prefetching functionality to prefetch data according to the sequence in advance of a next malware scan of the executable file.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

Embodiments of the present invention generally relate to performing file scanning operations using "logical prefetching." Logical prefetching involves preemptively bringing into memory pages of data needed for executing a file. In one or more embodiments, this logical prefetching functionality may be leveraged for improving file scanning operations as further described below with reference to FIGS. 1-4.

Figure 1:
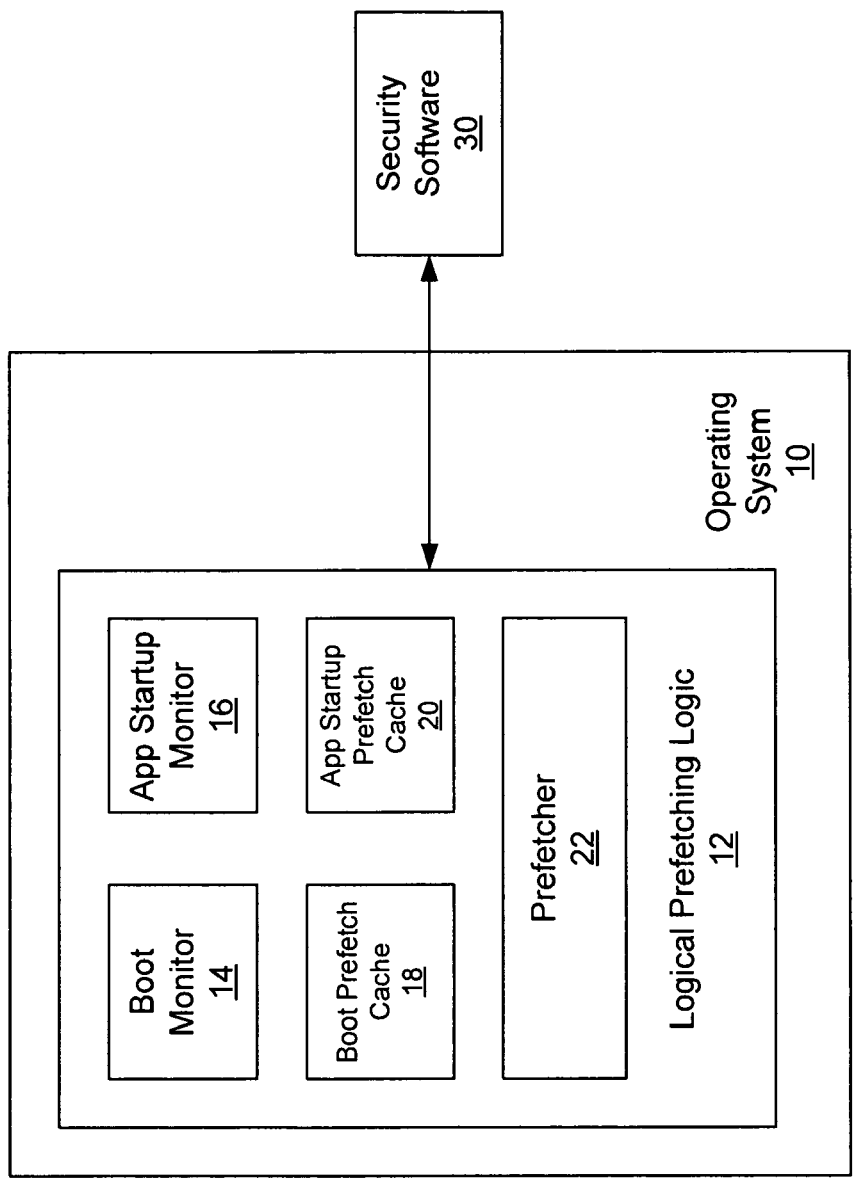
FIG. 1 shows a portion of a computer system in accordance with an embodiment of the present invention.

FIG. 1 shows a portion of an operating system (OS) 10 of a computer system. In general, the operating system 10 is capable of detecting and monitoring activity of the computer system. As part of its logical prefetching logic 12, the operating system 10 has boot monitor module 14 that monitors the ordering of data accesses for some amount of time during a boot process. An application startup monitor module 16 similarly monitors the ordering of data accesses for some amount of time during a particular application startup. For example, when the operating system or a user selects to open a particular program, one or more files stored on a hard disk (not shown) are executed as a result. As these files are executed, the operating system copies needed pages of data from the hard disk to main memory (e.g., random access memory (RAM)) (not shown) to allow for more efficient execution by a processor (not shown). Information relating to the sequence of pages accesses during particular boot and application startup scenarios are stored as part of "prefetch" files in the appropriate one of a boot prefetch cache 18 and an application startup prefetch cache 20 (collectively referred to herein as "prefetch cache").

Those skilled in the art will note that during a normal system boot or application startup, the order of data accesses may be such that some pages are brought in from one part of a file, then perhaps from a distant part of the same file, then from a different file, perhaps from a directory, and then again from the first file. This jumping around slows down each access considerably. Still referring to FIG. 1, by caching prefetch files specifying the order of data accesses during particular boot and application startup scenarios, a prefetcher 22, at a next launch of the particular boot or application startup scenario, may query the prefetch cache 18, 20 and preemptively bring into main memory batches of pages that will be needed for executing one or more of the necessary files. Thus, in other words, the prefetcher 22 attempts to speed up file execution by monitoring data accesses of boot and/or application startup processes and then using that information at the beginning of a subsequent boot and/or application startup process to prefetch pages of data into main memory. Such prefetching may be enabled by the prefetcher 22 notifying the operating system's 10 kernel of page transitions (page faults) specified by one or more prefetch files in the prefetch cache 18, 20, whereby the operating system 10 then preemptively copies the appropriate pages to main memory. However, those skilled in the art will note that using an incorrect or out-of-date prefetch file actually may adversely affect the performance of executing a particular file.

In one or more embodiments, all or part of the logical prefetching logic 12 may altogether be deactivated. For example, during a malware scan, the logical prefetching logic 12 may be selectively disabled so as to prevent the operating system from creating or updating prefetch cache files during the malware scan. The logical prefetching logic 12 may then be re-enabled for non-scanning scenarios. Those skilled in the art will note that such functionality may prevent performance loss attendant with unnecessary/inaccurate prefetch file caching or preserve performance improvement attendant with one or more embodiments of the present invention.

Further, in one or more embodiments, only the prefetcher 22 may be deactivated to disable prefetching while still allowing the prefetch cache 18, 20 to be kept up-to-date via monitoring by the boot monitor module 14 and application startup monitor module 16.

As described above, in one or more embodiments, the functionality provided by the logical prefetching logic 12 of the operating system 10 may be used for file scanning operations. This may be achieved using security software 30 that interfaces with the operating system 10, and more particularly with the logical prefetching logic 12. Now also, referring to FIG. 2, security software 30 is shown as having a plurality of modules, where a "module" is referred to herein as any program logic or functionality implemented in software and/or hardware.

In general, in a malware scanning scenario, security software 30 is configured to intercept requests to execute particular files. As described above, such requests are typically generated by the operating system 10 (during, for example, a boot process) and/or a user (when, for example, an application is launched). Upon or in response to the interception, security software 30 then uses one or both of the boot monitor module 14 and application startup module 16 to monitor data accesses during malware scanning of the files and build corresponding prefetch files in the prefetch cache 18, 20. These "scan-based" prefetch files are then saved in some known location so that when the executable files are next requested during a scanning scenario, security software 30 may load the previously built scan-based prefetch files into the prefetch cache 18, 20 and enable the prefetcher 22 to prefetch pages in advance of actually scanning the requested files.

The functionality of security software 30 described above is in part or wholly enabled by the following modules. During a scanning scenario, a control interception module 33 intercepts requests to execute one or more particular files. Such interception may be achieved by referencing code of security software 30 to appropriate known "hooks" in the operating system. For example, the control interception module 33 may be configured to interrupt a particular type of operating system function call initiated as a result of the file execution request. Once interrupted, the control interception module 33 then assumes control over the function.

When a file execution request is intercepted by security software 30, a prefetch cache query module 32 first queries a clean file cache 34. The clean file cache 34 references a plurality of files that have been previously scanned for malware and have not been modified since the previous malware scan. If the prefetch catch query module 32 finds that the requested file is referenced in the clean file cache 34, security software 30 may forgo scanning of that file and pass control of that file back to the operating system for execution.

If the requested file is not referenced in the clean file cache 34, the prefetch cache query module 32 queries the prefetch cache 18, 20 to determine whether one or more "non-scan-based" prefetch files exist for the requested file. In the case that there are no associated prefetch files, security software 30 then initiates scanning of the requested file and uses the boot monitor module 14 and/or application startup monitor module 16 to monitor data accesses during the malware scan. As the requested file is scanned under the direction of security software 30, the sequence of pages brought into main memory is recorded and used to build one or more corresponding scan-based prefetch files in the prefetch cache 18, 20.

In the case that the prefetch cache query module 32 finds associated non-scan-based prefetch files, control in security software 30 flows to a prefetch cache alteration module 36. In general, the prefetch cache alteration module 36 is configured to alter some aspect of a prefetch file so that it is recognizable (or usable or accessible) or not recognizable (or usable or accessible) by the logical prefetching logic 12. Thus, when there is an associated non-scan-based prefetch file in the prefetch cache 18, 20, the prefetch cache alteration module 36 alters that prefetch file in some way so that it is not susceptible to access or modification once security software 30 has initiated malware scanning and caused its own scan-based prefetch files to be built. Such alteration may occur one or more of various ways. For example, the prefetch cache alteration module 36 may rename a particular prefetch file, change a file extension of the prefetch file, and/or move the prefetch file to some known location outside of the prefetch cache 18, 20.

Upon completion of scanning the requested file for malware (or after some dynamic or predetermined stopping point), the prefetch cache alteration module 36 alters the built scan-based prefetch files so that they are not usable by the logical prefetching logic 12, restores any corresponding prefetch files that were previously altered in advance of the malware scan so that they are again usable by the logical prefetching logic 12, and passes control of the requested file to the operating system for execution.

When the requested file is again part of a boot or application startup process during a scanning scenario, the prefetch cache alteration module 36 alters any corresponding non-scan-based prefetch files in the prefetch cache 18, 20, loads the previously built scan-based prefetch files into the prefetch cache 18, 20, and alters those prefetch files to make them accessible to the logical prefetching logic 12. This enables the prefetcher 22 to prefetch the pages needed for the malware scan of the requested file.

Those skilled in the art will note that the functionality of the prefetch cache alteration module 36 described above prevents the malware scan from adversely affecting the integrity of the prefetch files the operating system should access and use during normal non-scanning scenarios. In other words, the prefetch cache alteration module 36, via one or more methods of file alteration, ensures that the operating system properly uses non-scan-based prefetch files during normal non-scanning scenarios and not any scan-based prefetch files built during one or more previous malware scans.

The actual malware scanning described above is enabled by one or more of a malware definition/signature store 38, a malware scanning module 40, and a malware remediation module 42. The malware definition/signature store 38 is arranged to keep an up-to-date database of the characteristics of known malware. The malware definition/signature store 38 may be updated automatically at fixed intervals, upon detection of newly available malware definitions or signatures, or upon user command.

Based on the information contained in the malware definition/signature store 38, the malware scanning module 40 is configured to scan the selected file using, for example, malware signature and/or heuristics analysis. As the malware scanning module 40 scans the selected file, various pages of data are either scanned in main memory (if those pages have been prefetched) or loaded and scanned (if those pages have not been prefetched).

The scanning by the malware scanning module 40 may result in the detection of malware running/residing on the computer system. The detected malware is then handled by the malware remediation module 42. The malware remediation module 42 may handle the detected malware in one or more various ways. For example, the malware remediation module 42 may simply quarantine the detected malware so as to isolate the detected malware from running processes. Moreover, the malware remediation module 42 may clean the detected malware by altogether deleting the detected malware from the computer system 10. Still further, the malware remediation module 42 may be caused to ignore the detected malware upon user command.

Security software 30 may also be provided with a communications interface module 44. The communications interface module 44 allows one or more modules of security software 30 to communicate with other components, both hardware and software. For example, the communications interface module 44 may support communications between security software 30 and the operating system 10. Further still, the communications interface module 44 may support communications over a secure communication channel (between, for example, the prefetch cache query module 32 and the prefetch cache 18, 20) to prevent the communications from being infected by malware.

The communications interface module 44 may be implemented in one or more of various ways. For example, in one or more embodiments, the communications interface module 44 may be implemented as a software interface over which one component makes function and data calls to another component. Further, in one or more embodiments, the communications interface module 44 may facilitate communications over a dedicated signal or signal wire between two or more components.

Figure 2:
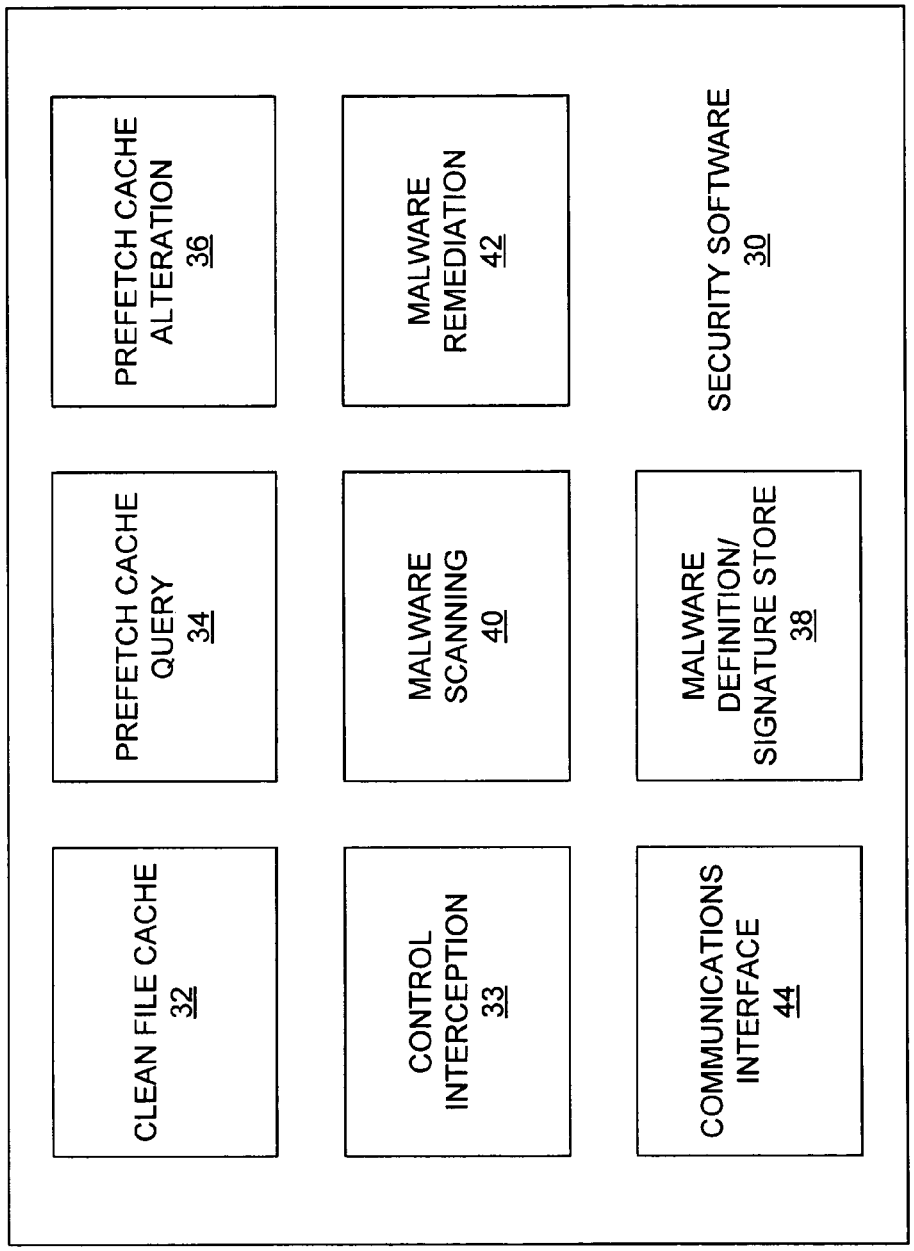
FIG. 2 shows a component diagram of security software in accordance with an embodiment of the present invention.

Those skilled in the art will note that although FIG. 2 has been shown and described as having modules of a particular number, types, and granularity, security software 30 in accordance with one or more embodiments may have any number and/or types of modules. For example, security software 30 in accordance with one or more embodiments may not be provided with a clean file cache module 34.

Further, although FIGS. 1 and 2 show some amount of logical prefetching functionality being implemented as part of the operating system 10, in one or more embodiments, security software 30 itself may be configured to support or instantiate some or all of the logical prefetching functionality shown as being part of the operating system 10 in FIG. 1. For example, should the operating system 10 not support logical prefetching functionality, security software 30 may implement in software similar or equivalent functionality of that provided by the boot monitor module 14, the application startup monitor module 16, the prefetch cache 18, 20, and/or the prefetcher 22. In other words, security software 30 may be provided with one or more additional modules for supporting logical prefetching functionality regardless of whether the operating system 10 provides its own logical prefetching mechanism.

Further, those skilled in the art will note that security software 30 may be provided in one or more of various forms. For example, in one or more embodiments, security software 30 may be a stand-alone computer program stored on a storage device (e.g., a hard disk, a tape drive, a compact disc (CD), a digital video disc (DVD), a universal serial bus (USB) drive, a disk drive). In such embodiments, security software 30 would run by being loaded into main memory and then executed. In still another example, security software 30 may be incorporated into the operating system 10. Further still, in one or more embodiments, security software 30 may be implemented as firmware. Yet further, security software 30 may be provided as "plug-in" software for a plug-in architecture supported by the operating system 10.

Figure 3:
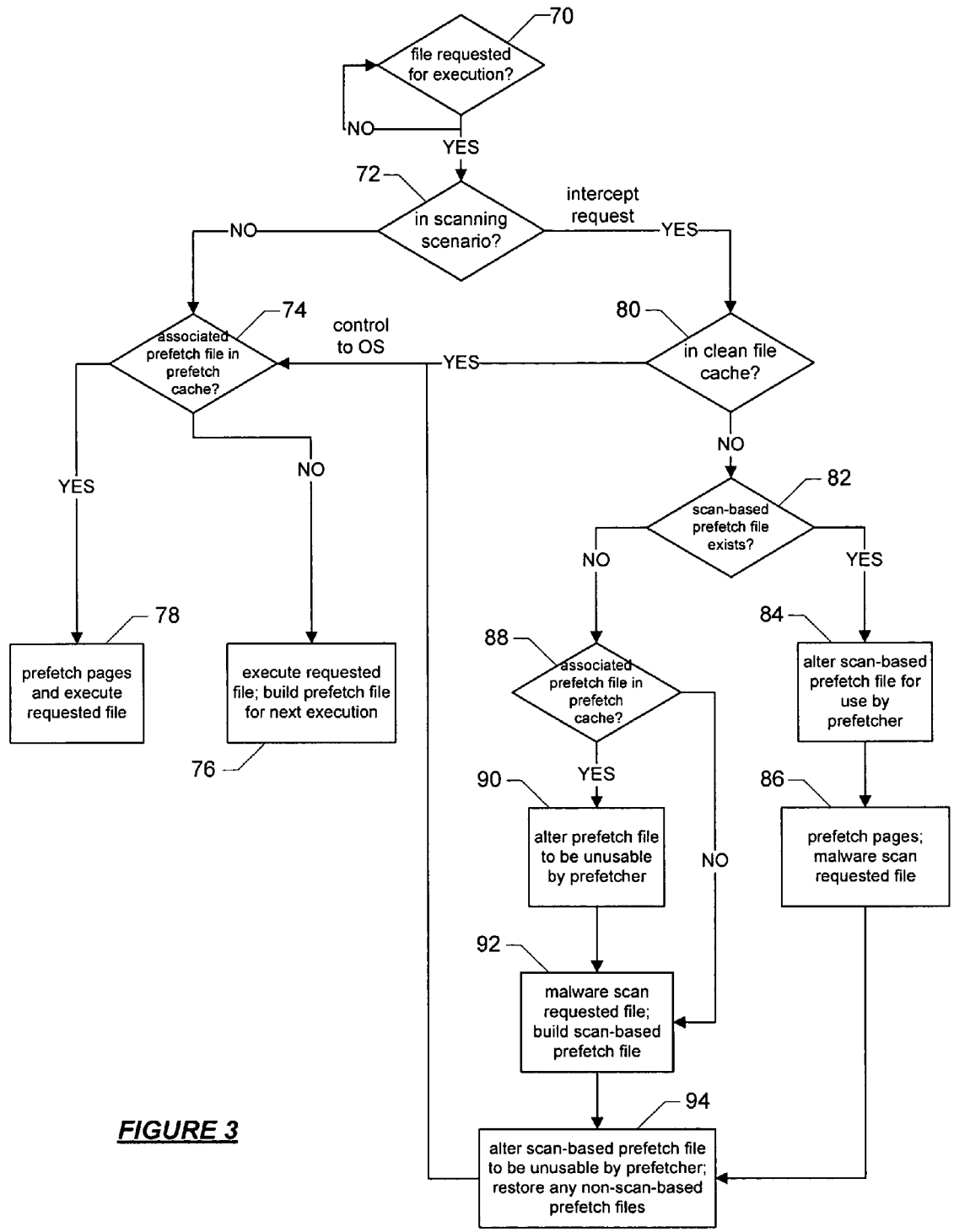
FIG. 3 shows a flow process in accordance with an embodiment of the present invention.

FIG. 3 shows a flow process in accordance with an embodiment of the present invention. Initially, a file is requested to be executed 70 as part of a boot or application startup process. Then, a determination is made 72 as to whether the system is in a scanning scenario. If not in a scanning scenario, control remains with the operating system, and logical prefetching logic 12 queries its prefetch cache 18, 20 to determine 74 whether a non-scan-based prefetch file exists for the requested file. If there is no such associated prefetch file, the requested file is executed, and as pages are loaded during the execution of the file, logical prefetching logic 12 may cause a prefetch file to be built 76 and saved in the prefetch cache 18, 20 for prefetching pages for a future request to execute the file. If, however, there is an associated prefetch file, the prefetcher 22 prefetches 78 the specified pages for execution of the requested file.

When in a scanning scenario, the control interception module 33 intercepts the request to execute the file, and the prefetch cache query module 34 queries the clean file cache 34 to determine 80 whether the requested file has been previously malware scanned and has not been modified since. If the requested file is clean, control of the requested file is passed back to the operating system 10 for execution. However, if the requested file is not referenced in the clean file cache 34, a determination is made 82 as to whether a scan-based prefetch file exists for the requested file. If such a scan-based prefetch file does exist, the prefetch cache alteration module 36 alters 84 the scan-based prefetch file so that it becomes recognizable to the logical prefetching logic 12 (and possibly alters one or more non-scan-based prefetch files existing in the prefetch cache 18, 20 to make them inaccessible to the logical prefetching logic 12), thereby causing the prefetcher 22 to prefetch 86 pages of data for the malware scanning of the requested file.

If there is no scan-based prefetch file, a determination is made 88 as to whether there is an existing non-scan-based prefetch file in the prefetch cache 18, 20 for the requested file. If there is such an existing prefetch file, the prefetch cache alteration module 36 alters 90 that file so that it is inaccessible to the logical prefetching logic 12. The requested file is then scanned 92 for malware by the malware scanning module 40, which results in the building 94 of an associated scan-based prefetch file in the prefetch cache 18, 20 via use of one or more of the boot monitor module 14 and the application startup module 16. Upon completion of the malware scan, the scan-based prefetch file is altered 94 by the prefetch cache alteration module 36 so that it becomes inaccessible to the logical prefetching logic 12. Further, any previously altered non-scan-based prefetch files are restored in the prefetch cache 18, 20. Thereafter, control of the requested file is passed back to the operating system for execution.

Figure 4:
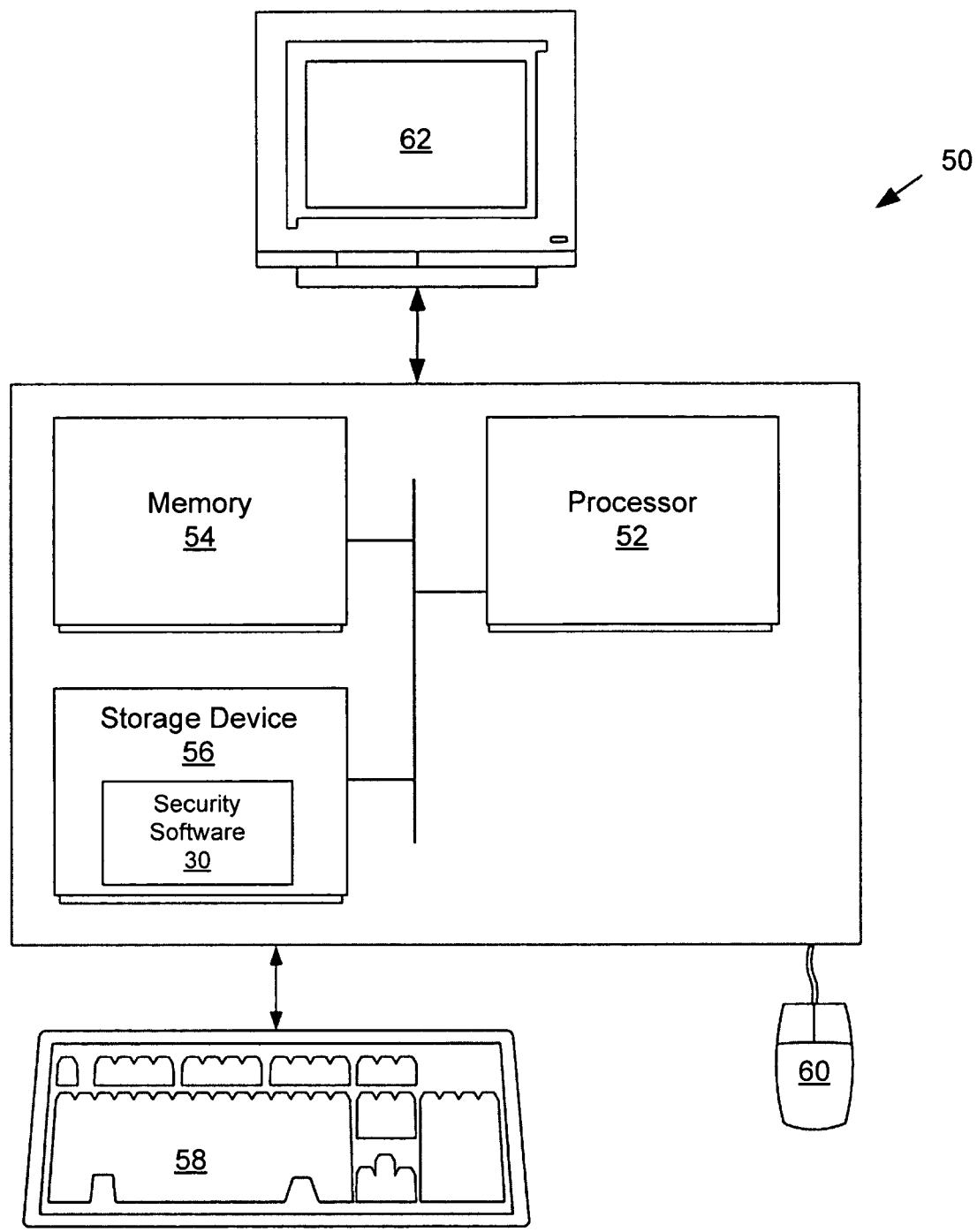
FIG. 4 shows a computer system in accordance with an embodiment of the present invention.

Further, one or more embodiments of the present invention may be associated with virtually any type of computer system, including multiprocessor and multithreaded uniprocessor systems, regardless of the platform being used. For example, as shown in FIG. 4, a networked computer system 50 includes at least one processor (e.g., a general-purpose processor, a field-programmable gate array (FPGA), an application-specific integrated circuit (ASIC), a graphics processor) 52, associated memory 54, a storage device 56 having, for example, security software 30, and numerous other elements (not shown) and functionalities typical of modern computer systems. The networked computer system 50 may also include input means (e.g., a keyboard 58, a mouse 62) and output means (e.g., a monitor 64). The networked computer system 50 may be connected to a local area network (LAN) or a wide area network (WAN) via a network interface connection (not shown). Those skilled in the art will appreciate that these input and output means may take other forms. Further, those skilled in the art will appreciate that one or more elements of the networked computer system 50 may be remotely located and connected to the other elements over a network. Further, software instructions to perform one or more embodiments of the present invention may be stored on a computer-readable medium such as a CD, a diskette, a tape, a file, a hard drive, or any other computer-readable storage device.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A computer-implemented method of protecting a computer system against malware, comprising:
   intercepting a request to load an executable file;
   determining whether a non-scan-based prefetch file exists for the executable file;
   responsive to a positive determination that the non-scan-based prefetch file exists, altering the non-scan-based prefetch file to be temporarily unusable;
   determining whether a scan-based prefetch file exists for the executable file, wherein the scan-based prefetch file specifies a sequence of data accesses supporting a malware scan of the executable file;
   responsive to a positive determination that the scan-based prefetch file exists, prefetching data for the executable file based on the sequence; and
   scanning the executable file for malware.

2. The computer-implemented method of claim 1, wherein the
   scanning uses the prefetched data.

3. The computer-implemented method of claim 1, further comprising:
   responsive to a negative determination that the scan-based prefetch file exists:
      tracking a sequence of data accesses during the scanning; and
      saving the sequence as the scan-based prefetch file for the executable file.

4. The computer-implemented method of claim 1, wherein the altering comprises at least one of:
   renaming the non-scan-based prefetch file; and moving the non-scan-based prefetch file to a location outside of a prefetch cache.

5. The computer-implemented method of claim 1, further comprising:
   restoring the altered non-scan-based prefetch file upon completion of the scanning.

6. A system for protecting a computer system against malware, comprising:
   a non-transitory program storage device readable by a machine and tangibly embodying instructions executable by the machine, the instructions comprising:
   a control interception module capable of intercepting a request to load an executable file;
   a prefetch cache query module capable of determining whether a non-scan-based prefetch file exists for the executable file;
   a prefetch cache alteration module capable of, responsive to a positive determination that the non-scan-based prefetch file exists, altering the non-scan-based prefetch file to be temporarily unusable;
   the prefetch cache query module further capable of determining whether a scan-based prefetch file exists for the executable file, wherein the scan-based prefetch file specifies a sequence of data accesses supporting a malware scan of the executable file;
   a prefetcher module capable of, responsive to a positive determination that the scan-based prefetch file exists, prefetching data for the executable file based on the sequence; and
   a malware scanning module capable of scanning the executable file for malware.

7. The system of claim 6, wherein the malware scanning module is capable of scanning the executable file using the prefetched data.

8. The system of claim 6, the instructions further comprising:
   a monitor module capable of tracking a sequence of data accesses during the scanning responsive to a negative determination that the scan-based prefetch file exists; and
   a prefetch cache module capable of saving the sequence as the scan-based prefetch file for the executable file.

9. The system of claim 6, wherein the altering comprises at least one of renaming the non-scan-based prefetch file and moving the non-scan-based prefetch file to a location outside a prefetch cache.

10. The system of claim 6, further comprising:
    the prefetch cache alteration module being further capable of restoring the altered non-scan-based prefetch file upon completion of the scanning.

11. A non-transitory program storage device readable by a machine, tangibly embodying a program of instructions executable by the machine to perform method steps for protecting the machine against malware, the instructions comprising instructions to:
    intercept a request to load an executable file;
    determine whether a non-scan-based prefetch file exists for the executable file;
    alter, in response to a positive determination that the non-scan-based prefetch file exists, the non-scan-based prefetch file to be temporarily unusable;
    determine whether a scan-based prefetch file exists for the executable file wherein the scan-based prefetch file specifies a sequence of data accesses supporting a malware scan of the executable file;
    prefetch, in response to a positive determination that the scan-based prefetch file exists, data for the executable file based on the sequence; and
    scan the executable file for malware.

12. The program storage device of claim 11, wherein the scan uses the prefetched data.

13. The program storage device of claim 11, further comprising instructions to:
    responsive to a negative determination that the scan-based prefetch file exists:
      track a sequence of data accesses during the scanning; and
      save the sequence as the scan-based prefetch file for the executable file.

14. The program storage device of claim 11, further comprising instructions to:
    restore the altered non-scan-based prefetch file upon completion of the scanning.

15. A computer system having logical prefetching functionality supported by an operating system of the computer system, comprising:
    security software in operative communication with the operating system, the security software executable by the computer system, stored on a non-transitory program storage device readable by the computer system and arranged to:
      intercept control from the operating system of an executable file requested for execution;
      determine whether a non-scan-based prefetch file exists for the executable file;
      responsive to a positive determination that the non-scan-based prefetch file exists, alter the non-scan-based prefetch file to be temporarily unusable by the logical prefetching functionality;
      scan the executable file for malware;
      use the logical prefetching functionality to build a scan-based prefetch file for the executable file, the scan-based prefetch file specifying a sequence of data accesses supporting the malware scan of the executable file; and
      use the logical prefetching functionality to prefetch data according to the sequence in advance of a next malware scan of the executable file.

16. The computer system of claim 15, the security software further arranged to:
    return control of the executable file to the operating system upon completion of the malware scan.

17. The computer system of claim 15, the security software further arranged to:
    restore the altered non-scan-based prefetch file upon completion of the malware scan.

* * * * *